United States Patent
Kuramoto

(10) Patent No.: US 10,026,935 B2
(45) Date of Patent: Jul. 17, 2018

(54) BATTERY EXTERIOR BODY, METHOD OF MANUFACTURING BATTERY EXTERIOR BODY, AND LITHIUM SECONDARY BATTERY

(71) Applicant: SHOWA DENKO PACKAGING CO., LTD., Isehara-shi, Kanagawa-ken (JP)

(72) Inventor: Tetsunobu Kuramoto, Shiga-ken (JP)

(73) Assignee: SHOWA DENKO PACKAGING CO., LTD., Isehara-Shi (JP)

(*) Notice: Subject to any disclaimer, the term of this patent is extended or adjusted under 35 U.S.C. 154(b) by 552 days.

(21) Appl. No.: 13/667,096

(22) Filed: Nov. 2, 2012

(65) Prior Publication Data

US 2013/0143107 A1 Jun. 6, 2013

(30) Foreign Application Priority Data

Nov. 7, 2011 (JP) .................................. 2011-243798

(51) Int. Cl.
*H01M 2/02* (2006.01)
*B32B 7/02* (2006.01)
(Continued)

(52) U.S. Cl.
CPC ............ *H01M 2/0287* (2013.01); *B32B 3/04* (2013.01); *B32B 7/02* (2013.01); *B32B 7/12* (2013.01);
(Continued)

(58) Field of Classification Search
CPC ............ H01M 2/0275; H01M 2/0287; H01M 10/052; B32B 7/12; B32B 27/32;
(Continued)

(56) References Cited

U.S. PATENT DOCUMENTS 6,045,883 A * 4/2000 Akiyama ................ C08L 23/10
428/35.7
7,285,334 B1 * 10/2007 Yamashita .......... H01M 2/0267
428/220
(Continued)

FOREIGN PATENT DOCUMENTS

JP 2001-283800 A 10/2001
JP 2007-265725 A 10/2007
(Continued)

OTHER PUBLICATIONS http://www.packworld.com/material-type/polymers/understanding-biaxially-and-monaxially-oriented-films, Oct. 2013.*
(Continued)

*Primary Examiner* — Lisa S Park
(74) *Attorney, Agent, or Firm* — Mori & Ward, LLP

(57) ABSTRACT

A battery exterior body which can be easily manufactured without additional process by heat-sealing internal layers of battery exterior materials, and has a high degree of safety with respect to gas generated in the inside of the exterior body, a method of manufacturing the battery exterior body, and a lithium secondary battery are provided. The battery exterior body is a battery exterior body 2 which is formed by heat-sealing internal layers 8 of battery exterior materials 4 formed by laminating an external layer 11 including a heat-resistant resin film, a metal foil layer 10, and the internal layer 8 in this order, and has a sealing strength between the heat-sealed internal layers 8 of 20 N/15 mm of width to 50 N/15 mm of width.

23 Claims, 1 Drawing Sheet

(51) Int. Cl.
- *B32B 7/12* (2006.01)
- *B32B 15/08* (2006.01)
- *B32B 15/20* (2006.01)
- *B32B 27/08* (2006.01)
- *B32B 27/32* (2006.01)
- *B32B 27/34* (2006.01)
- *B32B 27/36* (2006.01)
- *B32B 3/04* (2006.01)
- *H01M 10/052* (2010.01)

(52) U.S. Cl.
CPC ............ *B32B 15/08* (2013.01); *B32B 15/20* (2013.01); *B32B 27/08* (2013.01); *B32B 27/32* (2013.01); *B32B 27/34* (2013.01); *B32B 27/36* (2013.01); *B32B 2270/00* (2013.01); *B32B 2307/54* (2013.01); *B32B 2457/10* (2013.01); *H01M 10/052* (2013.01); *Y10T 29/49114* (2015.01)

(58) Field of Classification Search
CPC ........... B32B 15/08; B32B 15/20; B32B 3/04; B32B 27/08; B32B 27/34; B32B 7/02; B32B 27/36; B32B 2457/10; B32B 2270/00; B32B 2307/54; Y10T 29/49114
See application file for complete search history.

(56) References Cited

U.S. PATENT DOCUMENTS

| | | | |
|---|---|---|---|
| 2002/0142178 A1* | 10/2002 | Yamashita et al. | 428/461 |
| 2003/0180609 A1* | 9/2003 | Yamashita | H01M 2/021 429/185 |
| 2004/0224225 A1* | 11/2004 | Yamashita | H01M 2/0207 429/181 |
| 2006/0000734 A1* | 1/2006 | Ninomiya | A61K 9/703 206/438 |
| 2006/0093906 A1* | 5/2006 | Yamashita | B32B 15/08 429/176 |
| 2007/0224493 A1* | 9/2007 | Higuchi et al. | 429/130 |
| 2010/0255365 A1* | 10/2010 | Suzuta | 429/163 |
| 2013/0209868 A1* | 8/2013 | Suzuta | H01M 2/0275 429/176 |

FOREIGN PATENT DOCUMENTS

| | | |
|---|---|---|
| JP | 2008-277274 A | 11/2008 |
| JP | 2010-219024 A | 9/2010 |
| JP | 2011-098759 A | 5/2011 |

OTHER PUBLICATIONS

Communication dated Mar. 17, 2015 from the Japanese Patent Office in counterpart application No. 2011-243798.

* cited by examiner

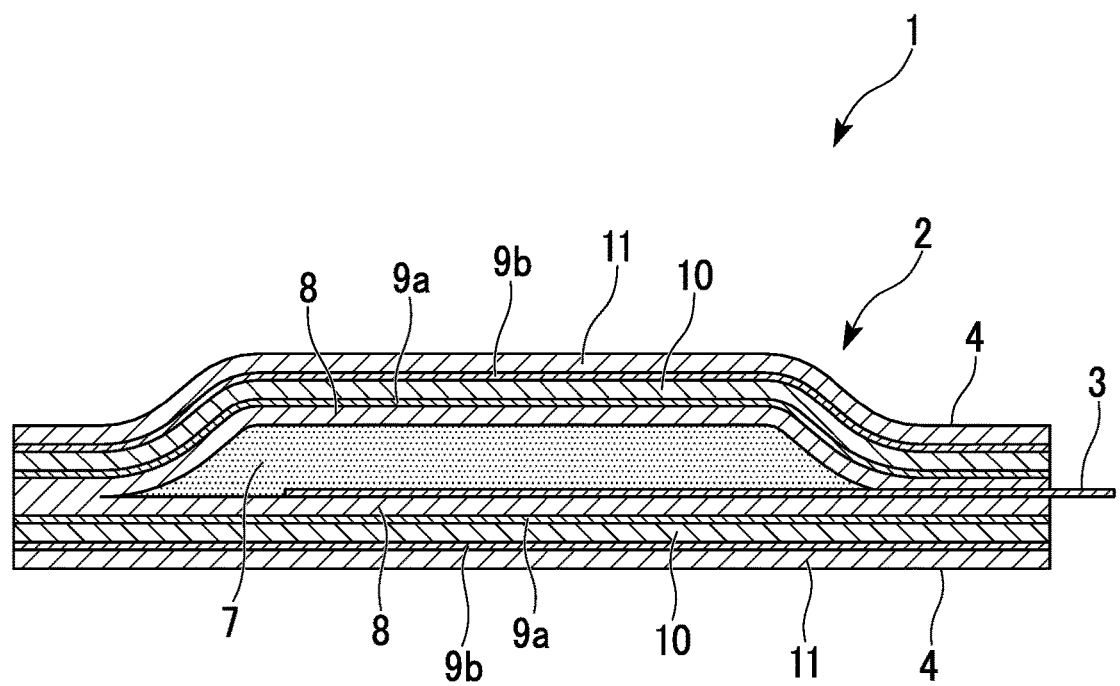

BATTERY EXTERIOR BODY, METHOD OF MANUFACTURING BATTERY EXTERIOR BODY, AND LITHIUM SECONDARY BATTERY

BACKGROUND OF THE INVENTION

The present invention relates to a battery exterior body, a method of manufacturing the battery exterior body, and a lithium secondary battery.

Priority is claimed on Japanese Patent Application No. 2011-243798, filed Nov. 7, 2011, and the contents of which are incorporated herein by reference.

BACKGROUND ART

In recent years, lithium secondary batteries have been widely used as driving sources of electronic devices such as video cameras, notebook computers and mobile phones, and batteries equipped in vehicles such as electric vehicles or hybrid vehicles. As a battery exterior body of a lithium secondary battery, an exterior body formed into a pouch shape by superimposing a sheet-like battery exterior material having resin layers formed on both surfaces of a metal foil layer, and heat-sealing the outer circumferential portion is known.

A positive electrode, a negative electrode, and an electrolyte are inserted into the battery exterior body of a lithium secondary battery. The battery exterior material having resin layers formed on both surfaces of a metal foil layer includes a metal foil layer that is excellent in terms of barrier properties with respect to oxygen or moisture. Therefore, a battery exterior body in which the above battery exterior material is used can prevent chemical changes of an accommodated article due to oxygen or moisture.

Meanwhile, when a lithium secondary battery is overcharged or overheated, gas is generated in the battery exterior body. As a technique that prevents rupture of the battery exterior body which is caused by the gas generated in the battery exterior body, Patent Document 1 (Japanese Unexamined Patent Application, First Publication No. 2007-265725) proposes providing a lithium ion battery provided with a safety valve for releasing the gas generated inside an exterior body to the outside of the exterior body at a part of the circumferential edge portion of the exterior body. In addition, Patent Document 2 (Japanese Unexamined Patent Application, First Publication No. 2001-283800) proposes an aluminum laminate external layer body provided with a gas purge valve.

However, in a case in which a valve for releasing the gas generated in the battery exterior body to the outside is provided in order to prevent rupture of the battery exterior body, a process for forming the valve is required, and there was a disadvantage that the manufacturing process thereof becomes complicated. In addition, in a case in which a valve that releases the gas generated in the battery exterior body to the outside is provided, there was a concern that the gas in the battery exterior body may be exhausted abruptly when the valve is operated.

The invention has been made in consideration of the above circumstances, and an object of the invention is to provide a battery exterior body which can be easily manufactured by heat-sealing the internal layers of battery exterior materials without additional process, and has a high degree of safety with respect to the gas generated in the inside of the exterior body, a method of manufacturing the battery exterior body, and a lithium secondary battery.

Regarding a battery exterior body formed into a pouch shape by superimposing a battery exterior material and heat-sealing the outer circumferential portion, the present inventors focused on the relationship between the sealing strength between the heat-sealed battery exterior materials and the pressure at which the battery exterior body ruptures, and carried out a thorough investigation.

As a result, it was found that, when the sealing strength between the heat-sealed battery exterior materials exceeds 50 N/15 mm of width, the pressure increases when the battery exterior body ruptures, and the impact of the rupture increases. In addition, it was found that, in a case in which the sealing strength between the battery exterior materials is less than 20 N/15 mm of width, the sealing strength is insufficient as the battery exterior material since an accommodated article leaks from the battery exterior body even when the pressure in the battery exterior body is low, or there is a tendency for oxygen or moisture to intrude into the battery exterior body.

In addition, in a case in which the sealing strength between the heat-sealed internal layers is 20 N/15 mm of width to 50 N/15 mm of width, some or all of the heat-sealed portion of the internal layers become separated or the heat-sealed internal layer ruptures (cohesive failure (CF)) before the pressure in the battery exterior body becomes excessively high due to the gas generated in the battery exterior body such that the pressure in the battery exterior body is relieved. In this case, even when the accommodated article begins to leak from the battery exterior body due to the relief of the pressure in the battery exterior body, the impact of the accommodated article which begins to leak on peripheral devices is small. Therefore, it was found that, in a case in which the sealing strength is 20 N/15 mm of width to 50 N/15 mm of width, peripheral devices are not easily damaged due to the gas generated in the battery exterior body, and a high degree of safety can be obtained, thereby achieving the invention. That is, the invention relates to the following.

SUMMARY OF THE INVENTION

[1] A battery exterior body formed by heat-sealing internal layers of battery exterior materials formed by laminating an external layer including a heat-resistant resin film, a metal foil layer, and an internal layer in this order, in which the sealing strength between the heat-sealed internal layers is 20 N/15 mm of width to 50 N/15 mm of width.

In addition, the present inventors repeated thorough studies regarding a battery exterior material from which a battery exterior body having a sealing strength between the internal layers of the heat-sealed battery exterior materials of 20 N/15 mm of width to 50 N/15 mm of width can be easily obtained.

As a result, it was found that it is possible to easily obtain a battery exterior body having a sealing strength in the above range and to secure favorable heat-sealing properties, chemical resistance, and insulating properties by forming a layer disposed on the inside when the battery exterior material is heat-sealed using a mixture of a polypropylene resin A having propylene as the polymerization unit thereof and a polyethylene resin B having ethylene and an α-olefin as the polymerization unit thereof.

[2] The battery exterior body according to [1], in which the internal layer is made of a mixture of a polypropylene resin A having propylene as the polymerization unit thereof and a polyethylene resin B having ethylene and an α-olefin as the polymerization unit thereof.

[3] The battery exterior body according to [2], in which the amount of the polypropylene resin A in the mixture is 80 mass % to 99 mass %.

[4] The battery exterior body according to [2] or [3], in which the particle size of the polyethylene resin B is in a range of 0.5 μm to 5 μm.

[5] The battery exterior body according to any one of [2] to [4], in which the polypropylene resin A is a propylene homopolymer or a copolymer of propylene and ethylene, and the polyethylene resin B has ethylene and an α-olefin having three or more carbon atoms as the polymerization unit thereof.

[6] The battery exterior body according to any one of [1] to [5], in which the external layer and/or the internal layer is adhered to the metal foil layer using an adhesive layer.

[7] The battery exterior body according to any one of [1] to [6], in which a chemical conversion treatment is carried out on the surface of the metal foil layer on the internal layer side.

[8] A lithium secondary battery having the battery exterior body according to any one of [1] to [7].

[9] A method of manufacturing the battery exterior body according to any one of [1] to [8] having a process of heat-sealing internal layers of battery exterior materials formed by laminating an external layer including a heat-resistant resin film, a metal foil layer, and an internal layer in this order.

[10] The method of manufacturing the battery exterior body according to [9], in which the internal layers are heat-sealed at a temperature of 160° C. to 230° C. and a pressure of 0.1 M Pa to 1 M Pa for 0.5 seconds to 10 seconds.

Effects of the Invention

Since the battery exterior body of the invention has a sealing strength between the heat-sealed internal layers of battery exterior materials of 20 N/15 mm of width to 50 N/15 mm of width, it is possible to improve the safety with respect to gas generated in the battery exterior body.

In addition, the battery exterior body of the invention is obtained by heat-sealing the internal layers of battery exterior materials, and can be easily manufactured without additional process.

In addition, it is possible to provide a highly safe lithium secondary battery by including the battery exterior body of the invention in the lithium secondary battery.

BRIEF DESCRIPTION OF THE DRAWINGS

FIG. 1 is a cross-sectional view showing an example of the lithium secondary battery of the invention.

BEST MODE FOR CARRYING OUT THE INVENTION

Hereinafter, a battery exterior material, a battery exterior body, and a lithium secondary battery which are embodiments of the invention will be described using the accompanying drawing.

FIG. 1 is a cross-sectional view showing an example of the lithium secondary battery of the invention. A lithium secondary battery 1 shown in FIG. 1 includes a positive electrode (not shown), a negative electrode (not shown), an electrolyte 7, and a battery exterior body 2 which encases the above. A separator may be disposed between the positive electrode and the negative electrode according to necessity.

The positive electrode and the negative electrode that are used include a collector made of a metal foil or a metal net and an electrode mixture laminated on the collector. The electrode mixture of the positive electrode contains a positive electrode active material, and the electrode mixture of the negative electrode contains a negative electrode active material.

Furthermore, tab leads 3 are joined to the respective collectors in the positive electrode and the negative electrode as removing terminals. The tab lead 3 has a base end portion in the longitudinal direction which is joined to the collector in the positive electrode or the negative electrode accommodated in the battery exterior body 2 and a front end portion in the longitudinal direction which penetrates the heat-sealed portion of the battery exterior body 2 so as to protrude outside the lithium secondary battery 1. In the vicinity of heat-sealed portions of the tab lead 3, the tab lead 3 is sandwiched by two sheets of sheet-like battery exterior materials 4 and 4, and a state in which internal layers 8 of the battery exterior materials 4 are heat-sealed on the surfaces of the tab lead 3.

The battery exterior body 2 is formed into a pouch shape by superimposing two sheets of the sheet-like battery exterior materials 4 and 4 so that the internal layers 8 and 8 face each other, and heat-sealing the internal layers 8 and 8 of the battery exterior materials 4 and 4. The battery exterior material 4 is formed by laminating an external layer 11 including a heat-resistant resin film, a metal foil layer 10, and an internal layer 8 in this order.

The battery exterior body 2 shown in FIG. 1 has a sealing strength between the heat-sealed internal layers 8 and 8 of 20 N/15 mm of width to 50 N/15 mm of width. Therefore, it is possible to prevent the pressure from increasing when the battery exterior body 2 ruptures and the impact of the rupture due to an excessively strong sealing strength of the battery exterior body 2 from becoming significant, and excellent safety can be obtained. In addition, it is possible to sufficiently prevent an accommodated article from leaking from the battery exterior body 2 and oxygen or moisture from intruding into the battery exterior body 2 due to a weak sealing strength of the battery exterior body 2, and favorable reliability and durability can be obtained.

In order to further improve safety, reliability, and durability, the sealing strength between the heat-sealed internal layers 8 and 8 is preferably 25 N/15 mm of width to 45 N/15 mm of width, and more preferably 30 N/15 mm of width to 40 N/15 mm of width.

(External Layer)

The external layer 11 that configures the battery exterior material 4 is configured to include one or two or more heat-resistant resin films. In a case in which the external layer 11 is constituted by two or more heat-resistant resin films, the two or more heat-resistant resin films are preferably laminated using adhesive layers.

The heat-resistant resin film that configures the external layer 11 play roles of securing the strength of the battery exterior material 4 and of securing the moldability of the battery exterior material 4 in a case in which recess portions are formed on the surfaces of the internal layer 8 and 8 sides in order to accommodate the positive electrode and the negative electrode in the battery exterior material 4. As the heat-resistant resin film that configures the external layer 11, a stretched film or the like of a polyamide (nylon) resin or a polyester resin can be preferably used. Specifically, nylon or polyethylene terephthalate (PET) is preferably used.

In addition, the melting point of the heat-resistant resin film that configures the external layer 11 is preferably higher than the melting point of a thermoplastic resin film that configures the internal layer 8. Thereby, it becomes possible to reliably carry out heat sealing of the battery exterior materials 4 when manufacturing the battery exterior body 2 without causing a hindrance to the external layer 11.

The thickness of the external layer 11 is preferably appropriately 10 μm to 50 μm, and more preferably approximately 15 μm to 30 μm. When the thickness of the external layer 11 is 10 μm or more, the stretched film is sufficiently stretched when molding the battery exterior material 4, necking does not occur in the metal foil layer 10, and poor molding does not easily occur. In addition, when the thickness of the external layer 11 is 50 μm or less, it is possible to sufficiently exhibit the effect of moldability.

(Metal Foil Layer)

The metal foil layer 10 that configures the battery exterior material 4 plays a role of securing the barrier properties of the battery exterior material 4. It is possible to use an aluminum foil, a stainless steel foil, a copper foil, or the like as the metal foil layer 10. An aluminum foil is preferably used as the metal foil layer 10 considering that the aluminum foil has excellent moldability and a light weight. As the material of the aluminum foil, an annealed aluminum material (soft material) of a pure aluminum-based alloy or an aluminum-iron-based alloy is preferably used.

The thickness of the metal foil layer 10 is preferably appropriately 20 μm to 80 μm in order to secure workability and secure barrier properties that prevent oxygen or moisture from intruding into the battery exterior body 2. In a case in which the thickness of the metal foil layer 10 is 20 μm or more, the metal foil layer 10 does not easily rupture when molding the battery exterior body 2, pinholes are not generated, and it is possible to effectively prevent oxygen or moisture from intruding into the battery exterior body 2. In addition, in a case in which the thickness of the metal foil layer 10 is 80 μm or less, the total thickness of the battery exterior body 2 does not become excessively thick, it is possible to prevent an increase in the weight, and it is possible to improve the volume energy density of a lithium secondary battery 1.

In addition, an undercoating treatment using a silane coupling agent, a titanium coupling agent, or the like or a chemical conversion treatment using a chromate treatment or the like is preferably carried out on the surfaces of the metal foil layer 10 on the external layer 11 side and/or the internal layer 8 side in order to improve the adhesiveness between the external layer 11 and the internal layer 8, or improve the corrosion resistance. In a case in which the metal foil layer 10 is an aluminum foil, a chromate treatment or anodization (an alumite treatment) is preferably carried out as the chemical conversion treatment.

(Internal Layer)

The internal layer 8 that configures the battery exterior material 4 is made of a thermoplastic resin that is heat-sealed so that the sealing strength between the internal layers 8 and 8 becomes 20 N/15 mm of width to 50 N/15 mm of width.

The sealing strength between the internal layers 8 and 8 is controlled so as to be in the above range by appropriately combining a material that is used as the thermoplastic resin that forms the internal layers 8 and 8, the contents of additives constituted by a resin, a filler, and the like which are not incompatible with the thermoplastic resin that forms the internal layers 8 and 8, and the conditions of temperature, pressure, and time when carrying out heat-sealing.

For example, when the additives are added to the thermoplastic resin that forms the internal layers 8 and 8, it is possible to decrease the sealing strength of the heat-sealed internal layers. Therefore, the sealing strength between the heat-sealed internal layers 8 and 8 can be controlled by including the above additives in the thermoplastic resin that forms the internal layers 8 and 8 and adjusting the amount of the additives added to the thermoplastic resin.

Specifically, in a case in which a propylene homopolymer is used as the thermoplastic resin that forms the internal layers 8 and 8, it is possible to easily adjust the sealing strength to 20 N/15 mm of width to 50 N/15 mm of width by using silica as the additive and adding 10 mass % to 20 mass % of the additive to the thermoplastic resin.

In addition, in order to easily adjust the sealing strength between the internal layers 8 and 8 to be in the above range, a material made of a mixture of a polypropylene resin A having propylene as the polymerization unit thereof and a polyethylene resin 13 having ethylene and an α-olefin as the polymerization unit thereof is preferably used as the material of the internal layer 8. In a case in which the internal layer 8 of the battery exterior material 4 is made of a mixture of the polypropylene resin A and the polyethylene resin B, the battery exterior body 2 having a sealing strength between the heat-sealed internal layers 8 and 8 of 20 N/15 mm of width to 50 N/15 mm of width and favorable heat-sealing properties can be obtained, and the battery exterior body 2 becomes excellent in terms of chemical resistance with respect to an electrolyte 7 and the like of the highly corrosive lithium secondary battery 1, and can secure the insulating properties between the metal foil layer 10 and the positive electrode or the negative electrode of the lithium secondary battery 1.

In addition, the mixture of the polypropylene resin A and the polyethylene resin B has a sea-island structure in which "islands (particles)" of the polyethylene resin 13 are dispersed in the "sea (matrix)" of the polypropylene resin A. The internal layer 8 made of the mixture having the above sea-island structure has a low sealing strength between the internal layers 8 and 8 compared to the internal layer made of the polypropylene resin A alone.

In addition, in the internal layer 8 made of a mixture having the sea-island structure, as the "islands" of the sea-island structure are smaller, and the number of the "islands" increases, the sealing strength between the internal layers 8 and 8 decreases.

Therefore, in a case in which the internal layer 8 is made of the mixture of the polypropylene resin A and the polyethylene resin B, the sealing strength between the heat-sealed internal layers 8 and 8 can be controlled by controlling the manufacturing conditions of the battery exterior material 4, the thickness of the internal layer 8, the mixing ratio between the polypropylene resin A and the polyethylene resin B, and the like so as to control the size and number of the "islands".

In the mixture having the sea-island structure in the embodiment, the particle diameter of the polyethylene resin B which is the size of the "island" is preferably in a range of 0.5 μm to 5 μm. In a case in which the particle diameter of the polyethylene resin B is in the above range, it is possible to easily adjust the sealing strength between the internal layers 8 and 8 to be 20 N/15 mm of width to 50 N/15 mm of width. In addition, in a case in which the particle diameter of the polyethylene resin B is 5 μm or less, the sealing strength between the internal layers 8 and 8 becomes sufficiently weak, and the sealing strength does not easily become more than 50 N/15 mm of width. In addition, in a case in which the particle diameter of the polyethylene resin B is 0.5 μm or more, the sealing strength between the internal layers 8 and 8 becomes sufficiently strong, and the sealing strength does not easily become less than 20 N/15 mm of width.

The particle diameter of the polyethylene resin B can be controlled using the viscosity ratio with the polypropylene resin A, and, for example, it is possible to control the particle diameter of the polyethylene resin B by adjusting the melt flow rates of both resins.

In addition, as the molecular weight of the polypropylene resin A in the mixture decreases, or the amount of the polypropylene resin A decreases so as to increase the amount of the polyethylene resin B, the sealing strength decreases. Therefore, the sealing strength between the heat-sealed internal layers 8 and 8 can also be controlled by controlling the kind of the polypropylene resin A in the mixture and/or the amount of the polypropylene resin A in the mixture.

The amount of the polypropylene resin A in the mixture is preferably 80 mass % to 99 mass %.

When the amount of the polypropylene resin A is 80 mass % or more, the sealing strength between the heat-sealed internal layers 8 and 8 becomes appropriately strong, and the sealing strength becomes liable to be 20 N/15 mm of width or more. In addition, when the amount of the polypropylene resin A is 99 mass % or less, the sealing strength between the heat-sealed internal layers 8 and 8 becomes appropriately weak, and the sealing strength becomes liable to be 50 N/15 mm of width or less.

The polypropylene resin A is not particularly limited as long as the polypropylene resin A has propylene as the polymerization unit, and a polypropoylene resin having a melt flow rate (MFR) measured at 230° C. of 1 g/10 min to 30 g/10 min is preferably used. Specific examples of the polypropylene resin A that can be used include propylene homopolymers or copolymers of propylene and ethylene, propylene-ethylene block copolymers, copolymers of propylene, ethylene and butene, and the like. Among the above, propylene homopolymers or copolymers of propylene and ethylene which are excellent in terms of chemical resistance and have heat resistance are preferably used as the polypropylene resin A.

In addition, the polyethylene resin B is not particularly limited as long as the polyethylene resin 13 has ethylene and an α-olefin as the polymerization unit thereof. Examples thereof include ethylene-propylene copolymers having ethylene and an α-olefin having three or more carbon atoms as the polymerization unit thereof, ethylene-butene copolymers, ethylene-hexene copolymers, ethylene-octene copolymers, and the like. Among the above, ethylene-propylene copolymers whose sealing strength can be easily controlled by controlling the content is preferably used as the polyethylene resin B.

The thickness of the internal layer 8 is preferably in a range of 0.1 μm to 200 μm, and more preferably in a range of 50 μm to 100 μm. When the thickness of the internal layer 8 is 0.1 μm or more, and preferably 50 μm or more, the sealing strength of the battery exterior body 2 can be sufficiently obtained, the sealing strength between the heat-sealed internal layers 8 and 8 becomes liable to be 20 N/15 mm of width or more, in addition, the corrosion resistance with respect to the electrolyte and the like improves, and the insulating properties between the metal foil layer 10 and the positive electrode or the negative electrode are increased. In addition, when the thickness of the internal layer 8 is 200 μm or less, and preferably 100 m or less, the sealing strength between the heat-sealed internal layers 8 and 8 becomes liable to be 50 N/15 mm of width or less.

In addition, the internal layer 8 may be constituted by a single layer, and may be a laminate of a plurality of layers having the same or different materials and/or thicknesses.

Furthermore, the melting point of the polypropylene resin A that configures the internal layer 8 is preferably in a range of 130° C. to 170° C., and more preferably 160° C. to 165° C. When the melting point of the polypropylene resin A having the sea-island structure is in the above range, the internal layer 8 has excellent heat resistance, the thickness of the internal layer 8 does not easily decrease during heat sealing, and the insulating properties of the internal layer 8 improve.

(Adhesive Layer)

An adhesive layer 9b is disposed between the external layer 11 and the metal foil layer 10 in order to adhere the external layer 11 and the metal foil layer 10. In addition, an adhesive layer 9a is disposed between the internal layer 8 and the metal foil layer 10 in order to adhere the internal layer 8 and the metal foil layer 10.

The adhesive layers 9a and 9b are preferably adhesive layers for dry laminate, and it is possible to use, for example, at least one selected from urethane-based adhesive layers, acid-modified polyolefin, styrene elastomer, acryl-based adhesive layers, silicone-based adhesive layers, ether-based adhesive layers, and ethylene-vinyl acetate-based adhesive layers, and a curing agent is added as necessary.

The thickness of the adhesive layers 9a and 9b is preferably in a range of 0.1 μm to 10 μm, and more preferably in a range of 1 μm to 5 μm. When the thickness of the adhesive layers 9a and 9b is in a range of 1 μm to 5 μm, a sufficient adhesive strength of the adhesive layers 9a and 9b can be obtained. In addition, in a case in which the thickness of the adhesive layer 9a on the internal layer 8 side is 1 μm or more, it is possible to further increase the insulating properties of the internal layer 8.

Meanwhile, the adhesive layer 9b on the external layer 11 side of the metal foil layer 10 and the adhesive layer 9a on the internal layer 8 side are preferably made of mutually different materials. In a case in which the external layer 11 is constituted by polyethylene terephthalate (PET) or nylon, a urethane-based adhesive is preferably used for the adhesive layer 9b. In addition, in a case in which the internal layer 8 is made of a resin including polypropylene, an acryl-based adhesive or an acid-modified olefin-based adhesive is preferably used for the adhesive layer 9a on the internal layer 8 side. The optimal adhesive strength between the respective materials and/or chemical-resisting performance can be provided by using mutually different materials for the adhesive layer 9b on the external layer 11 side and the adhesive layer 9a on the internal layer 8 side.

In addition, the internal layer 8 and the metal foil layer 10 may be laminated through the adhesive layer 9a, and also may be adhered using heat lamination in which a thermally adhesive resin that is excellent in terms of chemical resistance and electrolyte resistance is used. In this case, more favorable adhesiveness can be obtained between the internal layer 8 and the metal foil layer 10. Meanwhile, in a case in which the internal layer 8 and the metal foil layer 10 are adhered using heat lamination, the heat lamination is preferably carried out by extruding a thermally adhesive resin such as maleic anhydride-modified polypropylene which is modified using maleic anhydride between the metal foil layer 10 and the internal layer 8. In this case, use of a method in which the metal foil layer 10 and modified polypropylene, and the internal layer 8 and polypropylene are heat-laminated using a co-extruded resin of the thermoplastic resin that configures the internal layer 8 and polyolefin in the same system, for example, polypropylene and a modified polypropylene resin rather than a single-layer modified thermally adhesive resin as the thermally adhesive resin is superior in terms of costs.

In order to manufacture the battery exterior material 4 shown in FIG. 1, firstly, the external layer 11 including a heat-resistant resin film is prepared. In a case in which the external layer 11 includes two or more heat-resistant resin films, the two or more heat-resistant resin films are preferably laminated through the adhesive layer.

Next, the external layer 11 obtained in the above manner and the metal foil layer 10 are laminated using an adhesive made of the adhesive layer 9a. More specifically, for example, an adhesive for dry laminate is coated on the surface of the external layer 11 or the surface of the metal foil layer 10, then, the external layer 11 and the metal foil layer 10 are laminated, and a solvent included in the adhesive for dry laminate is volatilized. After that, the external layer 11 and the metal foil layer 10 are adhered using a method of dry lamination or the like, and a composite film including the external layer 11 and the metal foil layer 10 is manufactured.

Next, the internal layer 8 is formed. The internal layer 8 is obtained using a method in which, for example, a pellet made of the polypropylene resin A and a pellet made of the polyethylene resin B are prepared, the pellets are mixed at a predetermined mass ratio so as to produce a mixture, and then the mixture is extruded using a T-die molding method, thereby molding the internal layer 8 having a predetermined thickness. In the T-die molding method, for example, the mixture is preferably extruded at a temperature of 200° C. to 300° C. so as to be formed into a film shape. At 200° C. or lower, it is difficult to form the mixture into a film shape, and, at 300° C. or more, the surface of the extruded film becomes liable to be oxidation-degraded so as to be brittle, and there is a concern that the film may become inappropriate as a sealing material.

Next, the internal layer 8 obtained in the above manner and the composite film including the external layer 11 and the metal foil layer 10 are laminated using an adhesive made of the adhesive layer 9b. More specifically, for example, the adhesive for dry laminate is coated on the surface of the internal layer 8 or the surface of the metal foil layer 10 in the composite film, then, the internal layer 8 and the metal foil layer 10 in the composite film are laminated using the adhesive for dry laminate, and the solvent included in the adhesive for dry laminate is volatilized. After that, the internal layer 8 and the metal foil layer 10 in the composite film are adhered using a method of dry lamination or the like, and a sheet-like battery exterior material 4 including the internal layer 8, the metal foil layer 10, and the external layer 11 is produced.

Subsequently, two sheet-like battery exterior materials 4 and 4 obtained in the above manner are laminated in a manner in which the internal layers 8 and 8 face each other, and the outer circumferential portion is heat-sealed except an area that forms an opening portion so as to form a pouch shape, thereby producing the battery exterior body 2.

In the process of heat-sealing the internal layers 8 and 8, the internal layers are preferably heat-sealed at a temperature of 160° C. to 230° C. and a pressure of 0.1 MPa to 1 MPa for 0.5 seconds to 10 seconds. In a case in which the temperature, pressure, and time in the heat-sealing process are in the above ranges, it is possible to easily adjust the sealing strength between the internal layers 8 and 8 to 20 N/15 mm of width to 50 N/15 mm of width.

In the heat-sealing process, when any one or more of the temperature, pressure, and time exceeds the above ranges, there is a concern that the sealing strength may become excessively high. In addition, when any one or more of the temperature, pressure, and time is less than the above ranges, the sealing strength becomes liable to be insufficient.

Meanwhile, in any one or both of two heat-sealed sheet-like battery exterior materials 4 and 4, recess portions formed by recessing the surfaces on the internal layer 8 and 8 sides may be formed using deep drawing molding or bulging molding in order to accommodate the positive electrode, the negative electrode, and an electrolytic solution 7.

Next, separators are inserted into the pouch-shaped battery exterior body 2 as necessary together with the positive electrode, the negative electrode, and the electrolyte, the electrolytic solution 7 is further injected as necessary, and the internal layers 8 and 8 at the opening portion are heat-sealed so as to sandwich the tab lead projecting from the opening portion, thereby obtaining the lithium secondary battery 1 shown in FIG. 1 in which the battery exterior body 2 is sealed.

Since the battery exterior body 2 of the embodiment has a sealing strength between the heat-sealed internal layers 8 and 8 of 20 N/15 mm of width to 50 N/15 mm of width, the battery exterior body has excellent safety with respect to gas generated in the inside of the battery exterior body 2.

In addition, the battery exterior body 2 of the embodiment can be easily manufactured by heat-sealing the internal layers 8 and 8 of the battery exterior materials 4 without additional process.

Furthermore, since the battery exterior body 2 of the embodiment has excellent safety with respect to gas generated in the inside of the battery exterior body 2, the lithium secondary battery 1 having the battery exterior body has a high degree of safety.

EXAMPLES

Example 1

An external layer made of a 25 μm-thick stretched polyamide film (manufactured by Kohjin Holdings Co., Ltd., BONYL RX) and a 40 μm-thick aluminum foil (JIS standard A8079H-O) which is the metal foil layer were laminated through a 3 μm two-component cured urethane-based adhesive layer, and were dry-laminated under conditions of a speed of 80 m/min and a roll temperature of 80° C., thereby manufacturing a composite film including the external layer and the metal foil layer.

Next, an internal layer was manufactured using the method shown below. Firstly, a pellet made of the polypropylene resin A shown in Table 1 and a pellet made of the polyethylene resin B shown in Table 1 were prepared and mixed so as to produce a mixture. The amount of the polypropylene resin A in the mixture is shown in Table 1. After that, the mixture was extruded using a T-die molding method at a temperature shown in Table 1, thereby obtaining an internal layer.

TABLE 1

| | Polypropylene resin A | Polyethylene resin B | Amount of resin A | Particle diameter of polyethylene resin B | T-die molding temperature | Heat sealing conditions |
|---|---|---|---|---|---|---|
| Example 1 | Propylene homopolymer | Copolymer of ethylene and hexane-1 | 98 mass % | 2 μm | 250° C. | Both surfaces heated at 200° C., 0.2 MPa for 2 seconds |
| Example 2 | Propylene homopolymer | Copolymer of ethylene and propylene | 98 mass % | 4 μm | 250° C. | Both surfaces heated at 200° C., 0.2 MPa for 2 seconds |
| Example 3 | Propylene homopolymer | Copolymer of ethylene and hexane-1 | 96 mass % | 3 μm | 250° C. | Both surfaces heated at 200° C., 0.2 MPa for 2 seconds |
| Example 4 | Propylene homopolymer | Copolymer of ethylene and octene | 96 mass % | 3 μm | 250° C. | Both surfaces heated at 200° C., 0.2 MPa for 2 seconds |
| Example 5 | Propylene-ethylene copolymer | Copolymer of ethylene and propylene | 95 mass % | 3 μm | 230° C. | Both surfaces heated at 200° C., 0.2 MPa for 2 seconds |
| Example 6 | Propylene-ethylene copolymer | Copolymer of ethylene and hexane-1 | 95 mass % | 3 μm | 230° C. | Both surfaces heated at 200° C., 0.2 MPa for 2 seconds |
| Example 7 | Propylene homopolymer | Copolymer of ethylene and hexane-1 | 98 mass % | 2 μm | 250° C. | Both surfaces heated at 200° C., 0.2 MPa for 2 seconds |
| Comparative example 1 | Propylene homopolymer | — | 100 mass % | — | 250° C. | Both surfaces heated at 200° C., 0.2 MPa for 2 seconds |
| Comparative example 2 | — | Copolymer of ethylene and hexane-1 | 0 mass % | 2 μm | 250° C. | Both surfaces heated at 200° C., 0.2 MPa for 2 seconds |
| Comparative example 3 | Propylene homopolymer | Copolymer of ethylene and hexane-1 | 70 mass % | 2 μm | 250° C. | Both surfaces heated at 200° C., 0.2 MPa for 2 seconds |

Next, the internal layer obtained in the above manner and the composite film including the external layer and the metal foil layer were laminated through a 1.5 μm two-component cured acryl-based adhesive layer, and were dry-laminated under conditions of a speed of 80 m/min and a roll temperature of 80° C., thereby obtaining a sheet-like batter exterior material of Example 1.

Next, the particle diameter of the polyethylene resin B in the internal layer of the battery exterior material of Example 1 obtained in the above manner was measured using a method shown below. The results are shown in Table 1.

"Particle Diameter of the Polyethylene Resin B"

A cross-section of a battery packing material was observed using a scanning electron microscope (SEM) or a sample dyed with $RuO_4$ was observed using a transmission electron microscope (TEM), the minor axes and the major axes of the dispersed polyethylene resin B were measured respectively in a view range of 100 μm×100 μm, were arithmetically averaged, and the average particle diameter was measured as the arithmetic average values of the minor axes and the major axes.

Subsequently, two battery exterior materials of Example 1 were laminated in a manner in which the internal layers faced each other, and the outer circumferential portion was heat-sealed under the conditions shown in Table 1 except an area that formed an opening portion, thereby forming the internal circumference of the heat-sealed internal layer into a rectangular pouch shape having a size of 20 cm in height and 15 cm in width on a planar view and obtaining the battery exterior body of Example 1.

Example 2

A battery exterior body of Example 2 was obtained in the same manner as in Example 1 except that a pellet made of the polyethylene resin B shown in Table 1 was used as the polyethylene resin B.

Example 3

A battery exterior body of Example 3 was obtained in the same manner as in Example 1 except that the amount of the polypropylene resin A was set as shown in Table 1.

Example 4

A battery exterior body of Example 4 was obtained in the same manner as in Example 1 except that the amount of the polypropylene resin A was set as shown in Table 1, and a pellet made of the polyethylene resin B shown in Table 1 was used as the polyethylene resin B.

Example 5

A battery exterior body of Example 5 was obtained in the same manner as in Example 1 except that a pellet made of the polypropylene resin A shown in Table 1 was used as the polypropylene resin A, the amount of the polypropylene resin A in the mixture was set as shown in Table 1, and a pellet made of the polyethylene resin B shown in Table 1 was used as the polyethylene resin B.

Example 6

A battery exterior body of Example 6 was obtained in the same manner as in Example 1 except that a pellet made of the polypropylene resin A shown in Table 1 was used as the polypropylene resin A, and the amount of the polypropylene resin A in the mixture was set as shown in Table 1.

Example 7

A battery exterior body of Example 7 was obtained in the same manner as in Example 1 except that a chromate treatment (chemical conversion treatment) was carried out on both surfaces of a 40 µm-thick aluminum foil (JIS standard A8079H-O) which is a metal foil layer.

Comparative Example 1

A battery exterior body of Comparative example 1 was obtained in the same manner as in Example 1 except that the polyethylene resin B was not mixed.

Comparative Example 2

A battery exterior body of Comparative example 1 was obtained in the same manner as in Example 1 except that the polypropylene resin A was not mixed.

Comparative Example 3

A battery exterior body of Comparative example 1 was obtained in the same manner as in Example 1 except that the amount of the polypropylene resin A in the mixture was set as shown in Table 1.

Meanwhile, the particle diameters of the polyethylene resins B in the internal layers of the battery exterior materials used for the battery exterior bodies of Examples 1 to 7 and Comparative examples 1 to 3 were measured respectively using the same method as in Example 1. The results are shown in Table 1.

Meanwhile, the particle diameter of the polyethylene resin B was controlled by adjusting the melt flow rates of the polypropylene resin A and the polyethylene resin B in the following manner.

That is, when the melt flow rate of the polypropylene resin A measured at 230° C. was represented by α, and the melt flow rate of the polyethylene resin B measured at 190° C. was represented by β, in a case in which the particle diameter of the polyethylene resin B was 2 µm, α and β were set to 8 g/10 min and 15 g/10 min respectively, in a case in which the particle diameter of the polyethylene resin B was 3 µm, α and β were set to 8 g/10 min and 10 g/10 min, and, in a case in which the particle diameter of the polyethylene resin B was 4 µm, α and β were set to 8 g/10 min and 8 g/10 min respectively. In addition, the melt flow rate was measured using the method described in JISK 7210.

"Sealing Strength"

For the battery exterior bodies of Examples 1 to 7 and Comparative examples 1 to 3 obtained in the above manner, the sealing strength between the heat-sealed internal layers of the battery exterior materials was measured using the method described below.

That is, a 15 mm-wide specimen was taken from each of the areas in which the internal layers of the battery exterior bodies of Examples 1 to 7 and Comparative examples 1 to 3 were heat-sealed in the vertical direction to the sealing direction, the strength was measured using a strograph manufactured by Toyo Seiki Co., Ltd. when the sealed portions were separated at a tensile speed of 100 min/min, and was considered as the sealing strength.

"Internal Pressure Increase-Preventing Properties"

In addition, the battery exterior bodies of Examples 1 to 7 and Comparative examples 1 to 3 were filled with 100 cc of water, were sealed by heat-sealing the opening portions under the same conditions as for the outer circumferential portion, and were disposed between two parallel 1 cm-thick plates. After that, a load was loaded in a direction in which the battery exterior bodies of Examples 1 to 7 and Comparative examples 1 to 3 were compressed using the two plates so that some of the heat-sealed portion of the internal layers was separated, or the heat-sealed internal layers were broken such that water in the battery exterior bodies leaked.

In addition, cases in which water in the battery exterior body leaked with a load of 2 kg to 10 kg were evaluated as "O", and cases in which water in the battery exterior body leaked with a load of more than 10 kg or less than 2 kg were evaluated as "X".

(Results)

The measurement results of the sealing strengths and the evaluation results of the internal pressure increase-preventing properties of the battery exterior bodies of Examples 1 to 7 and Comparative examples 1 to 3 are shown in Table 2.

TABLE 2

|  | Sealing strength | Internal pressure increase-preventing properties |
|---|---|---|
| Example 1 | 35 N/15 mm of width | O |
| Example 2 | 34 N/15 mm of width | O |
| Example 3 | 25 N/15 mm of width | O |
| Example 4 | 27 N/15 mm of width | O |
| Example 5 | 23 N/15 mm of width | O |
| Example 6 | 24 N/15 mm of width | O |
| Example 7 | 35 N/15 mm of width | O |
| Comparative example 1 | 60 N/15 mm of width | X |
| Comparative example 2 | 70 N/15 mm of width | X |
| Comparative example 3 | 15 N/15 mm of width | X |

As shown in Table 2, in Examples 1 to 7, the sealing strengths were 20 N/15 mm of width to 50 N/15 mm of width, and the evaluation results of the internal pressure increase-preventing properties were "O".

In contrast to the above, in Comparative example 1 in which the polyethylene resin B was not included and Comparative example 2 in which the polypropylene resin A was not included, the sealing strengths were too high to be in the range of the invention, and the evaluation results of the internal pressure increase-preventing properties were low.

In addition, in Comparative example 3 in which the amount of the polypropylene resin A in the mixture was small, the sealing strength was too low to be in the range of the invention, and the evaluation results of the internal pressure increase-preventing properties were low.

Thus far, the preferable examples of the invention have been described, but the invention is not limited to those examples. The addition, removal, and substitution of the configuration, and other modifications are permitted within the scope of the purport of the invention. The invention is not limited to the above description, and is limited only by the scope of attached claims.

What is claimed is:

1. A battery exterior body comprising:
   a first battery exterior material comprising:
   a first external layer including a heat-resistant resin film;
   a first metal foil layer laminated on the first external layer; and
   a first internal layer laminated on the first metal foil layer to sandwich the first metal foil layer between the first external layer and the first internal layer;
   a second battery exterior material comprising:
   a second external layer including a heat-resistant resin film;
   a second metal foil layer laminated on the second external layer; and
   a second internal layer laminated on the second metal foil layer to sandwich the second metal foil layer between the second external layer and the second internal layer; and the first battery exterior material and the second battery exterior material being connected such that the first internal layer and the second internal layer are opposite to each other and heat-sealed, a sealing strength between the first internal layer and the second internal layer having a lower limit of 20 N/15 mm of width and an upper limit of 50 N/15 mm of width, wherein the upper limit of 50 N/15 mm of width prevents high pressure rupture.

2. The battery exterior body according to claim 1, wherein the first internal layer and the second internal layer are made of a mixture of a polypropylene resin having propylene as a polymerization unit thereof and a polyethylene resin having ethylene and an α-olefin as a polymerization unit thereof.

3. The battery exterior body according to claim 2, wherein an amount of the polypropylene resin in the mixture is 95 mass % to 99 mass %.

4. The battery exterior body according to claim 2, wherein a particle size of the polyethylene resin is in a range of 0.5 μm to 5 μm.

5. The battery exterior body as claimed in claim 2,
wherein the polypropylene resin is a propylene homopolymer or a copolymer of propylene and ethylene, and
wherein the polyethylene resin has ethylene and an α-olefin having three or more carbon atoms as the polymerization unit thereof.

6. The battery exterior body as claimed in claim 1,
wherein the first external layer and the first internal layer are adhered to the first metal foil layer via an adhesive layer, and
wherein the second external layer and the second internal layer are adhered to the second metal foil layer via an adhesive layer.

7. The battery exterior body as claimed in claim 1,
wherein a chemical conversion treatment is carried out on a surface of the first metal foil layer on the first internal layer side; and
wherein a chemical conversion treatment is carried out on a surface of the second metal foil layer on the second internal layer side.

8. The battery exterior body according to claim 1, wherein the first external layer comprises a stretched film of nylon or polyethylene terephthalate.

9. The battery exterior body according to claim 1, wherein the first external layer has a thickness ranging from 10 μm to 50 μm.

10. The battery exterior body according to claim 1, wherein the first metal foil layer has a thickness ranging from 20 μm to 80 μm.

11. The battery exterior body according to claim 7, wherein the chemical conversion treatment is one or more selected from the group consisting of an undercoating treatment using a silane coupling agent or a titanium coupling agent, a chromate treatment and an anodization treatment.

12. The battery exterior body according to claim 2, wherein the mixture further comprises silica in an amount ranging from 10 mass % to 20 mass %.

13. The battery exterior body according to claim 1, wherein the first internal layer has a thickness ranging from 1.0 μm to 200 μm.

14. The battery exterior body according to claim 1, wherein the first internal layer is a laminate of a plurality of layers having the same or different materials and/or thickness.

15. The battery exterior body according to claim 2, wherein the polypropylene resin is one or more selected from the group consisting of propylene homopolymer, copolymer of propylene and ethylene, propylene-ethylene block copolymer, and copolymer of propylene, ethylene and butene.

16. The battery exterior body according to claim 2, wherein the polypropylene resin has a melting point in a range of 130° C. to 170° C.

17. The battery exterior body according to claim 2, wherein the polyethylene resin is one or more selected from the group consisting of ethylene-propylene copolymer having ethylene and α-olefin having three or more carbon atoms as the polymerization unit thereof, ethylene-butene copolymer, ethylene-hexene copolymer, and ethylene-octene copolymer.

18. The battery exterior body according to claim 1, wherein the first external layer and the first metal foil layer have an adhesive layer therebetween, and the adhesive layer is one or more selected from the group consisting of urethane-based adhesive, acid-modified polyolefin adhesive, styrene elastomer adhesive, acryl-based adhesive, silicone-based adhesive, ether-based adhesive, and ethylene-vinyl acetate-based adhesive.

19. The battery exterior body according to claim 1, wherein the first external layer and the first metal foil layer have an adhesive layer therebetween, and the adhesive layer has a thickness in a range of 0.1 μm to 10 μm.

20. The battery exterior body according to claim 1, wherein the first external layer and the first metal foil layer have a first adhesive layer therebetween, and the first internal layer and the first metal foil layer have a second adhesive layer therebetween, and the first adhesive layer and the second adhesive layer are made of different materials.

21. A lithium secondary battery having the battery exterior body as claimed in claim 1.

22. A method of manufacturing the battery exterior body as claimed in claim 1, comprising:
a process of heat-sealing the first internal layer and the second internal layer.

23. The method as claimed in claim 22, wherein the first internal layer and the second internal layer are heat-sealed at a temperature of 160° C. to 230° C. and a pressure of 0.1 MPa to 1 MPa for 0.5 seconds to 10 seconds.

* * * * *